July 4, 1933.  H. M. LYTEL  1,916,766
HIGH PRESSURE RELIEF VALVE
Filed Feb. 12, 1932
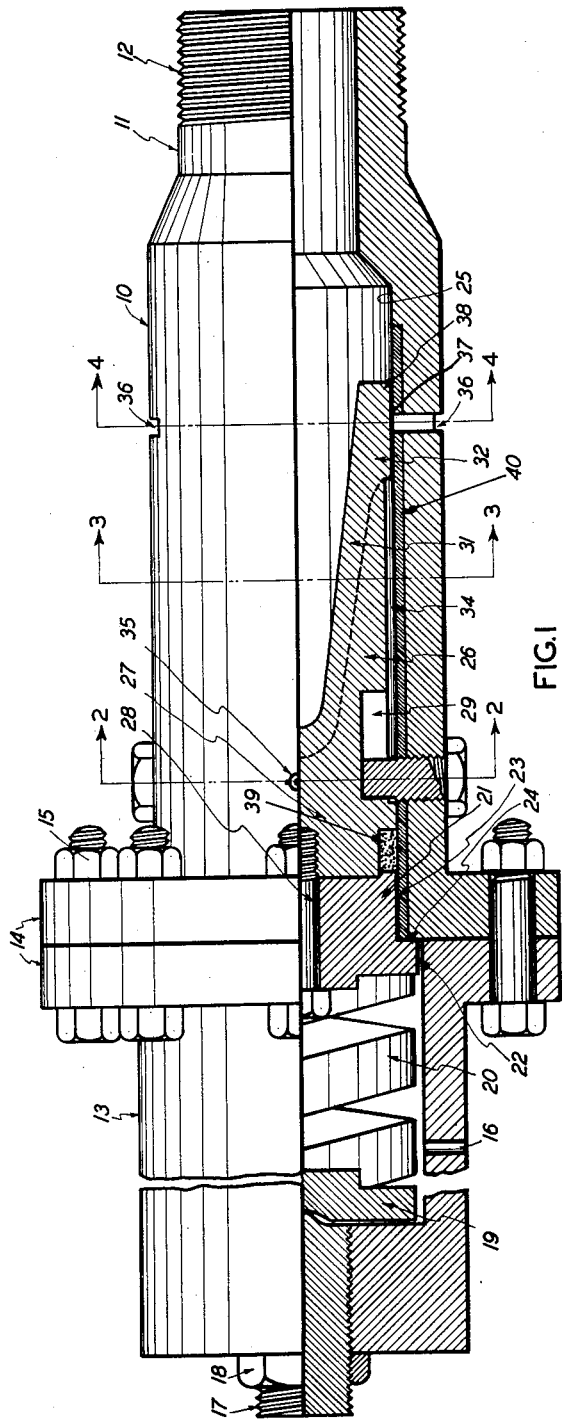
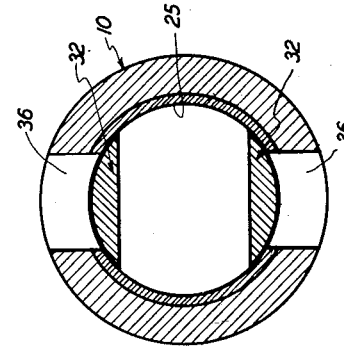
FIG. 4
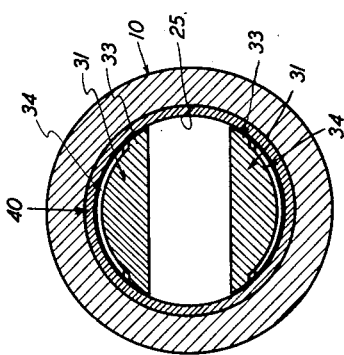
FIG. 3
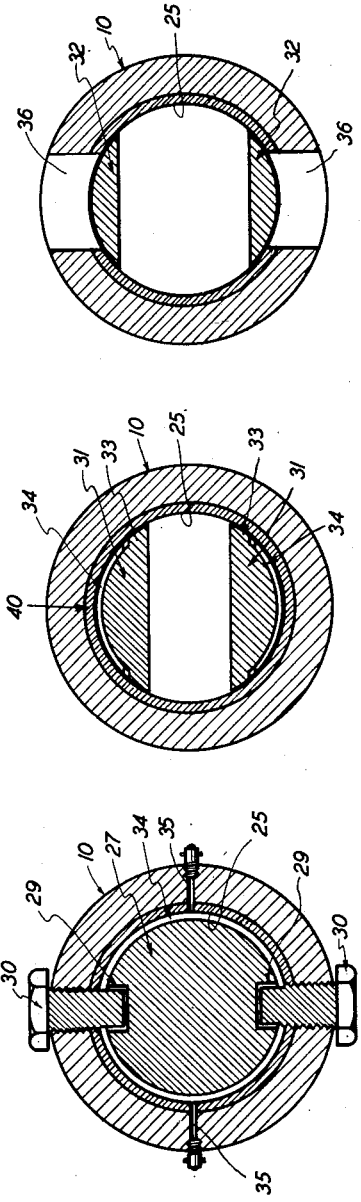
FIG. 2
HARVEY M. LYTEL
INVENTOR
ATTORNEY Patented July 4, 1933

1,916,766

UNITED STATES PATENT OFFICE

HARVEY M. LYTEL, OF LOS ANGELES, CALIFORNIA

HIGH PRESSURE RELIEF VALVE

Application filed February 12, 1932. Serial No. 592,562.

The object of my invention is to provide a valve for relieving excessive pressure on pipes or pipe lines carrying fluids at extremely high hydraulic head and particularly for relieving the pressure in the mud circulating system used in drilling oil wells by the rotary method.

In this service the duty is exceptionally heavy not only because of the high pressures carried, which may often be an excess of 1500 pounds per square inch, but more particularly because the semi-fluid mud which is pumped into the well contains much abrasive matter in suspension, this material resulting from the disintegration of hard rocks, sandstone and the like by the drilling bit.

The devices heretofore used for the relief of excessive mud-fluid pressures have, to the best of my knowledge, been relatively slight modifications of various types of relief valve suitable for the handling of clear fluid such as clean water. In brief, they have had a metallic seat and a spring restrained disc normally pressing against the seat and lifting against spring load to relieve the pressure, the discs being of metal or of rubber.

In such valves, which are of the well-known locomotive pop-valve type, the released fluid passes between the seat and the disc and therefore passes at high pressure and high velocity over the two surfaces which, by their mutual contact, are supposed to make a tight joint when the valve seats. When such valves are used for relieving pressure on mud-fluids containing large proportions of sand and comminuted hard rock the contacting surfaces rapidly become channeled, the valves start to leak almost immediately and the useful life of the valve is very much reduced.

The principal object of my invention, then, is to provide a valve in which one of the contacting surfaces slides over the other, uncovering a port formed through one of the contacting surfaces at right angles to the plane of contact. The wear which occurs in a valve of this type takes place mainly on the interior of the port itself and tends to constantly enlarge it, but this enlargement is relatively slow and may be continued without interrupting the functioning of the valve or causing it to leak until it has proceeded to the point where the travel of the slide in a closing direction no longer suffices to close the port.

I have also provided what I believe to be novel means for holding the slide valve on its seat by means of the internal pressure of the fluid being controlled, and for so lubricating the slide valve as to prevent undue wear between the sliding surfaces and to prevent the intrusion of abrasive matter between the sliding and the fixed portions of the valve.

This and other advantages inherent in my invention will be evident on inspection of the attached drawing in which Fig. 1 is a longitudinal view of the assembled valve, partly in elevation and partly in center section.

Fig. 2 is a cross-section of the valve on the line 2—2 of Fig. 1.

Fig. 3 is a cross-section through the valve on the line 3—3 of Fig. 1.

Fig. 4 is a cross-section through the valve on the line 4—4 of Fig. 1.

Referring to the drawing, 10 is a preferably cylindrical body which may be diminished in diameter as at 11 and threaded as at 12 for attachment to the system containing the liquid whose pressure is to be controlled. 13 is a bonnet which may suitably be attached to the body 10 by means of the flanges 14 and the bolts and nuts 15. 16 is an air vent through the wall of the bonnet which may also be utilized for the introduction of oil when the valve is placed in a horizontal or upright position.

17 is an adjusting screw actuated by a T or other handle not shown and provided with a lock nut 18. This screw acts on a spring block 19 through which any desired pressure may be placed on the heavy coil spring 20.

The spring 20 presses against the follower 21, which should be a relatively loose fit within the bonnet, as at 22, but should be a snug sliding fit in the bore of the body 10, as at 23. A shoulder 24 engages the end of the body to limit the travel of the spring.

The body 10 is provided with an interior bore 25 which should be truly cylindrical and parallel and finished to an exact sliding fit with the piston 26. This piston is formed with a solid end 27 which is bolted to the spring block 21 by means of a cap screw 28. This end of the piston is provided with one or more slots 29 in which are inserted screws 30 threaded through the wall of the body to prevent revolution of the piston while permitting a limited free longitudinal movement.

The skirt of the piston is divided and cut away to form two projecting tongues 31—31 which at their outer extremity, as shown at 32, and around the edges of the relieved portion, as shown at 33, are ground to a neat sliding fit within the bore 25. Within this bearing projection or rib, which forms an unbroken contact with the wall of the bore around the entire periphery of the two skirts, an annular space 34 is provided, this space or channel completely surrounding the solid end 27 and extending down the skirt within the bearing rib. Grease channels and gun fittings 35 are provided for the forcible insertion of grease into this annular space for lubricating the piston. By applying sufficient pressure to this grease, particularly at a time when the pressure within the valve body is reduced, the projecting tongues of the skirt may be slightly lifted and a film of grease extruded between the bore and the bearing rib, thus flushing out and carrying away any abrasive matter which may tend to work in between the sliding surface and the fixed surface.

Approximately mid-way of the area of contact between the end 32 of each tongue and the bore of the body, I form a port 36 which is completely closed by the skirt when the follower 21 is in the position shown, with the spring 20 fully extended. As pressure within the valve body increases, the piston and the spring block are forced outwardly, compressing the spring, and when this compression has proceeded to the desired extent, which may be controlled by adjusting the screw 17, the inner edge of the port 36 will be uncovered and fluid will escape through the port until the pressure has been reduced sufficiently to permit the spring to extend and the skirt to again cover the port. It will be obvious that such wear as occurs will take place mainly at the inner edge 37 of the port and the lower outer corner 38 of the tongue, and I prefer to face these portions of the valve with the hardest alloy metal which can be ground to the necessary sliding contact. The remainder of the valve will be found to suffer very little wear if reasonable attention is given to lubricating it at intervals. The split construction of the piston and the provision of the tongues, the tips of which close the ports by sliding over them, permit expansion of the tongues against the bore, the pressure within and without the bore being unbalanced by the provision of the open ports. The pressure of the tongue against the wall will therefore be roughly proportional to the pressure within the valve body, obviating any tendency to leakage between the tongue and the bore.

It is desirable, though not absolutely essential, that the annular space 39 of Fig. 1 be filled with hydraulic packing, a split ring or other means for retaining grease and preventing it from being forced past the follower 21.

It is also desirable, but not essential, that a liner 40 be provided within the body 10; so that as wear between the piston 26 and the bore 25 occurs, these light and cheap parts may be replaced without discarding the expensive valve body 10.

While I have disclosed a specific embodiment of my invention, it will be understood that the construction shown may be materially varied without departing from the spirit of the invention and that its scope shall be limited solely by the scope of the attached claims.

I claim as my invention:

1. A pressure release valve, comprising: a body having a longitudinal bore, a plurality of ports formed in the wall of said body and a piston sliding within said bore, the skirt of said piston being divided into tongues, said tongues tapering longitudinally and being substantially flat rearwardly, the extremity of each said tongue covering one of said ports when said piston is in a retracted position.

2. A pressure release valve, comprising: a body having a longitudinal bore; a plurality of ports formed in the wall of said body and a piston sliding within said bore, the skirt of said piston being divided into tongues, the extremity of each said tongue covering one of said ports when said piston is in a retracted position, and a continuous rib formed about the periphery of said tongues and bearing against said bore, said rib defining an annular space between said piston and said bore.

3. A structure substantially as defined in claim 2, including means for introducing grease under pressure into the space defined by said rib.

In witness that I claim the foregoing I have hereunto subscribed my name this 6th day of February, 1932.

HARVEY M. LYTEL.